June 22, 1937.   J. BIJUR   2,084,316
LUBRICATION
Filed March 11, 1930   3 Sheets-Sheet 1

INVENTOR
Joseph Bijur
BY
Dean, Fairbank, Hirsch & Hirsch
ATTORNEYS

June 22, 1937.   J. BIJUR   2,084,316
LUBRICATION
Filed March 11, 1930   3 Sheets-Sheet 2

INVENTOR
Joseph Bijur
BY
ATTORNEYS

Patented June 22, 1937

2,084,316

UNITED STATES PATENT OFFICE 2,084,316

LUBRICATION

Joseph Bijur, New York, N. Y., assignor to Auto Research Corporation, a corporation of Delaware Application March 11, 1930, Serial No. 434,846

56 Claims. (Cl. 184—7)

My present invention is shown embodied in a central chassis and engine lubricating system although the general principle of the invention is applicable to the distribution of other fluids for other purposes.

A general object of the invention is to provide a chassis lubricating system functioning automatically as long as the engine is running and requiring no attention, not even the charging of a special reservoir or the manipulation of a valve or manual adjustment or operation, in order to initiate or maintain proper flow to the bearings.

Another object is to propel lubricant to the chassis bearings by the use of pressure mechanism already present on the vehicle and to meter the lubricant for correct feed to various chassis bearings irrespective of varying propulsive pressures or varying viscosity of the oil in the distributing lines.

Another object is to accomplish in a chassis lubricating system, fed from a source of pressure inherently incapable of such action, automatic compensation for the retardation in oil flow due to the great increase in viscosity of the lubricant, with falling temperatures.

Another object is to provide an installation by which ordinary engine oil may be delivered from the crank case continuously throughout operation of the vehicle and under the pressure exerted by the engine oil pump substantially at the slow rate required by the chassis bearings, without jeopardy to the engine oiling system, even though a break occurs in the chassis feed lines, without danger of overoiling or underoiling the chassis bearings or danger of clogging the flow passages with solid particles entrained with the crank case oil.

Another object is to provide a simple automatic master regulating unit for a system of the above type having an automatic and inherent action to accomplish the flow compensation required.

Another object is reliably to accomplish the extremely slow yet diverse rates of feed to the different bearings, required in a continuous feed system while avoiding the use of flow retarding outlets so finely calibrated as to be excessive in cost, and more particularly to render feasible the use of drip plugs of the general character disclosed in my prior Patent #1,632,772.

Another object is to provide a lubricating installation devoid of parts that occupy space on the dash-board or instrument board.

Another object is to provide a system of the above type, of simple, rugged, durable, inexpensive construction, the various parts of which may be readily manufactured in quantity production, and are capable of ready access for cleaning and replacement of soiled filters.

A feature of the present invention is the provision of a centralized lubricant distributing system having flow restriction outlet branches, which is equipped with an automatic master regulator device through which the pump feeds to the lines, such regulator device being preferably in the nature of a thermostatic reducing valve operative to reduce higher pressure from the engine oil pump or other source to a line pressure commensurate with proper feed of the lubricant under varying pump pressures and varying temperatures of the oil in the distributing system.

The invention may be more fully understood from the following description in connection with the accompanying drawings wherein:—

Figures 1, 2, 3, 4:
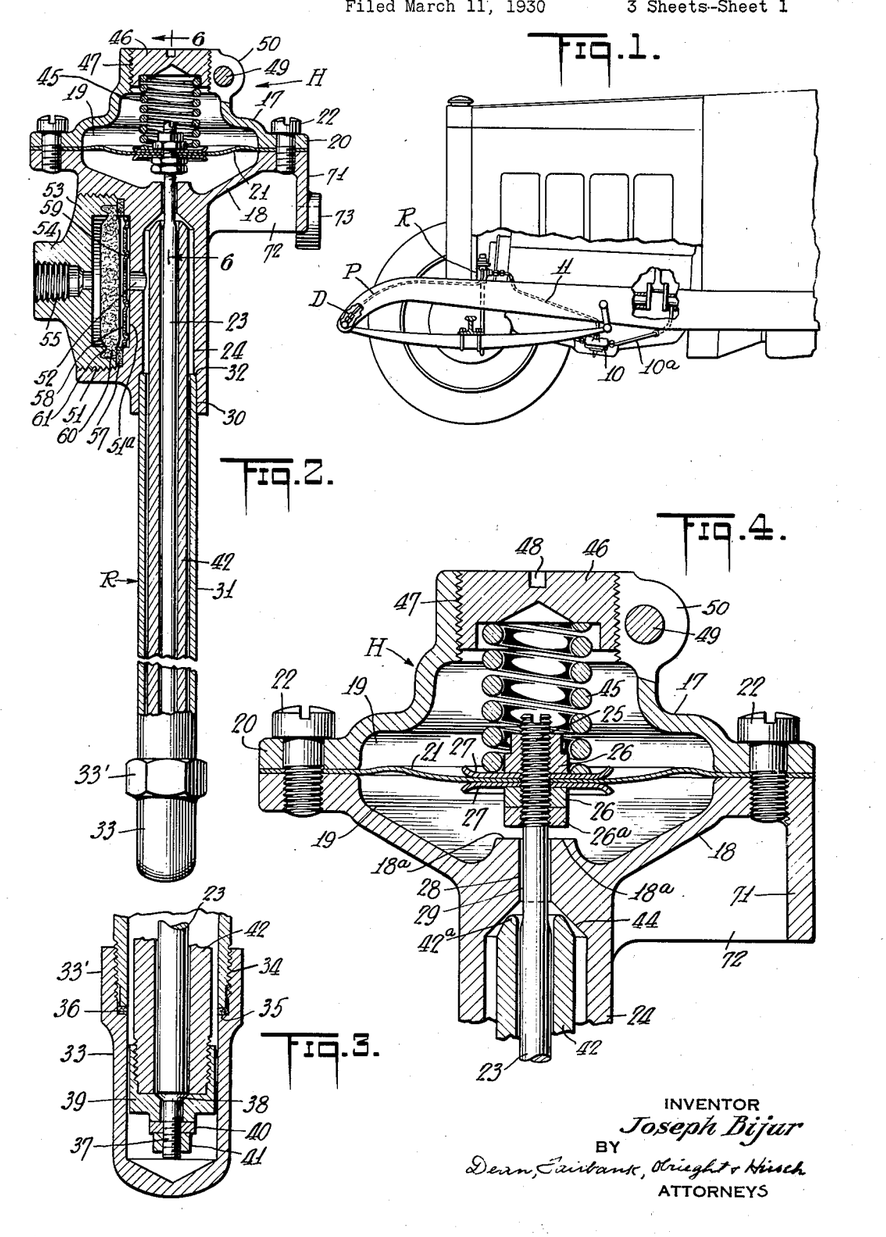
Fig. 1 is a fragmentary view of an automobile equipped with my improved lubricating system.
Fig. 2 is an enlarged broken view in longitudinal section through the thermostatic pressure reducing valve which serves as the master regulator.
Fig. 3 is a sectional detail on a still larger scale of the lower end of the regulator.
Fig. 4 is a similarly enlarged view in vertical section through the upper end thereof.
Figure 8:
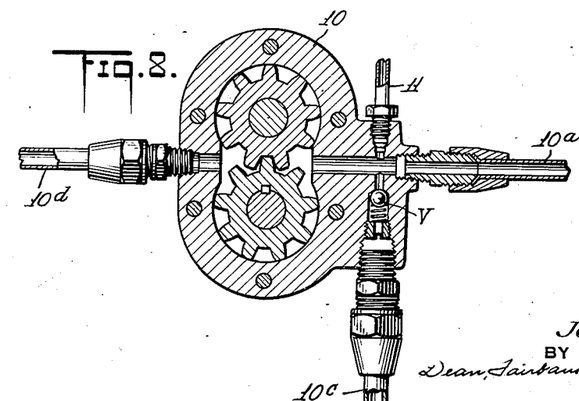
Fig. 8 is a sectional view through the engine oil pump showing the two outlets therefrom.

Referring now to the drawings there is shown in Fig. 1 a general layout of automobile chassis, indicating in diagrammatic view the conventional oil pump 10 of a pressure engine oil lubricating system having an inlet pipe $10^d$ and delivering through a suitable conduit $10^a$ (Fig. 8) to the various engine bearings. In parallel with the outlet to the engine bearings, the engine oil pump has another outlet pipe 11 from which the chassis lubricating system derives its lubricant. A by-pass return pipe 10c to the sump is normally closed by a pressure relief valve V. The pipe 11 leads to a regulator unit R the construction of which will be more fully described hereinafter. The unit R has an outlet 12 (Fig. 6) leading to the chassis distributing system. The latter includes one or more main pipes P leading generally along structural parts of the vehicle and providing with a multiplicity of outlet branches in parallel, leading to various chassis bearings. The outlet branches have flow proportioning resistances which may be in the character of drip plug fittings D applied at the various bearings. These drip plugs are preferably of a character adapted to feed under very low pressure and accordingly valveless or having valves seated by weak springs.

The drip plug may be of any of various possible constructions, examples of which are disclosed in my prior Patent No. 1,632,772, of June 14, 1927 and in the prior British patent to Auto Research Corporation No. 261,967 of March 13th, 1926.

Figures 9, 10, 11, 12, 13:
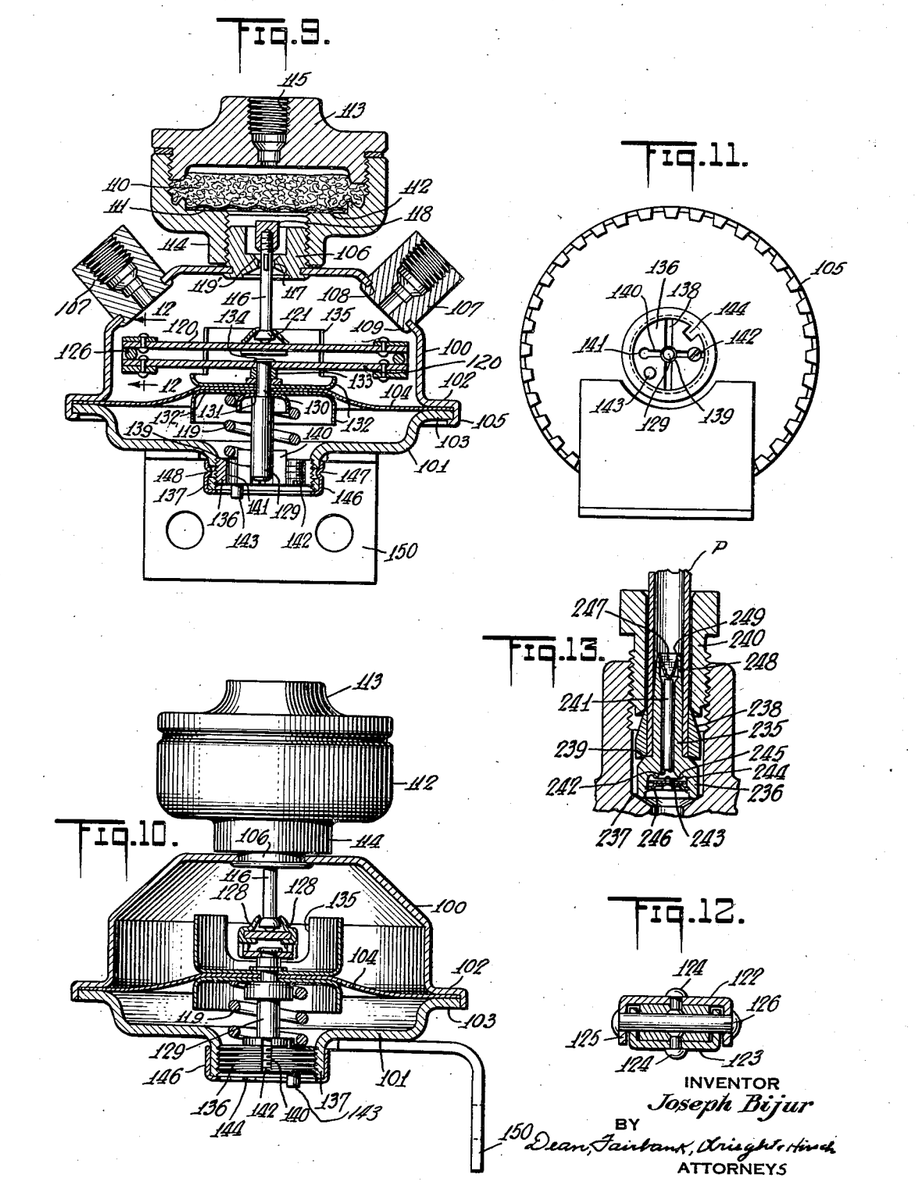
Fig. 9 is a vertical sectional view through a modified form of master regulator.
Fig. 10 is a generally similar view partly in section and partly in elevation at right angles to Fig. 9.
Fig. 11 is a bottom plan view of the regulator of Fig. 9.
Fig. 12 is a sectional detail on the line 12—12 of Fig. 9, and on an enlarged scale.
Fig. 13 is a sectional detail of one of the drip plugs of the system.

A specific construction particularly useful in the present relation is shown in Fig. 13 and is quite similar to the disclosure of the prior British patent referred to. The construction need be described but briefly, as it is claimed herein only in combination as a constituent part of the system as a whole.

The drip plug comprises a cartridge unit 235 having an enlarged head 236 abutting at its edge against the bevelled bottom 237 of the bearing socket. The shank of the cartridge of reduced diameter is encircled by the end of the feed pipe 11 which abuts against the head and is clamped against said shank by a compression coupling comprising a tapered coupling sleeve 238 having a milled concave end 239 pressed against the head of the cartridge by the inner end of a bushing 240 which encircles the pipe, is threaded into the socket and forces the edge of the coupling sleeve 238 inward against the pipe 11 to clamp the latter against the cartridge shank 235.

The cartridge has a longitudinal bore of accurately predetermined diameter, housing a pin 241 also of accurately predetermined diameter, which determines a crevice of definite resistance to flow under a given pressure. The resistance or rating of the cartridge will depend on the diameter of the pin and the rating will preferably be marked upon the cartridge. The pin is maintained in place within its bore by staking the cartridge as at 242 at the lower extremity of the pin.

Preferably a flap disk valve 243 is disposed in an axial socket 244 within the head of the cartridge and coacts with an annular seat 245 formed in said head and is limited in its displacement from said seat by a closure cap 246 staked in place within the head.

A protective strainer 247 is disposed in a corresponding enlargement 248 at the inlet end of the cartridge. This strainer may comprise a conically shaped area of wire mesh having its reduced end toward the end of the pin and its rim trapped under an inturned head 249 at the extremity of the cartridge.

With the system thus far described, assuming the effective pressure of the oil pump to be such as to cause approximately correct feed of the oil through the drip plugs at a given temperature in summer, it will be apparent, that due to the tremendous rise in viscosity of the oil in winter say to fifty times its value in summer, the pump would feed only a small percentage of the requirements to the bearings in winter which would at that time be so greatly under-lubricated as to be substantially unlubricated.

The ordinary engine oil pump is inherently unsuitable, properly to lubricate the chassis under the widely varying temperature conditions thereat, especially so, since at the same time it must perform its primary function of engine lubrication. By means of my regulator, the engine oil pump is completely adapted for proper feed of the chassis while engine lubrication is in no respect interfered with.

The master regulator device illustrated in Figs. 2 to 8 inclusive, preferably comprises a head H and a shank R, the head being mounted within one of the forward corners of the engine compartment and the stem extending downwardly through the drip pan with substantially its entire length exposed to the air. The head H of the regulator within which all of the operating parts of the regulator are mounted and to which the oil inlet and outlet connections are attached may conveniently comprise a pair of castings 17 and 18 having opposed concavities 19, serving to define a diaphragm chamber. The castings have aligned clamping flanges 20 held together by securing devices 22 and gripping the edges of a diaphragm 21 between them.

The center of the diaphragm is attached to a valve stem 23 which extends through a restricted central inlet opening 28 in the lower chamber of the head and through a pendant socket portion 24 of the casting 18. The threaded upper end 25 of the rod passes through the diaphragm and is secured thereto by nuts 26 threaded on the rod and clamping stiffening discs 27 against opposite faces of the diaphragm, lower nut 26 being locked by a locking nut 26a.

Inlet passage 28 is preferably of diameter only slightly greater than that of the stem 23, which is flatted at 29 to provide clearance for the flow of liquid through the passageway 28. The outlet 12 from the head is in the nature of an inclined generally radial passageway formed in a radial web 70, integral with the lower casting of the head but projecting radially therebeyond. Outlet passageway 12 communicates with an upwardly facing socket 300 formed in the end of the web 70 beyond the periphery of the flanges 20. A suitable fitting such for instance as the elbow fitting 301 is adapted to be applied at the socket 300 to provide a passageway from the socket 300 to the main chassis feed line. Fitting 301 has a threaded extension 302 to screw into the socket and is formed at its other end with a suitable socket 303 for the reception of a chassis outlet pipe such as the pipe P.

The elongated shank R includes a pipe 31 soldered into the lower enlarged end 30 of the socket 24 and abutting shoulder 32, defined by such enlargement. A screw cap 33 with a nut conformation 33' for reception of a wrench has an enlarged internally threaded end 34 to screw over and close the threaded lower end of the tubular shank 31. The cap 33 has an internal shoulder 35 exerting pressure against the end of tubular shank 31 through an interposed gasket 36 thereby to effect an oil-tight seal.

The valve stem 23 extends beyond the lower end of the shank 31 and is formed with a reduced threaded lower end 37, defining a bevelled downwardly facing shoulder 38. A generally cup-shaped member 39 slipped over the threaded valve stem extension 37, is pressed upward against the shoulder 38 by a nut 40, backed by a lock nut 41. The lower end of an elongated tubular thermostatic valve element 42 encircling valve stem 23 is screwed into the cup 39. The upper end of the long tubular thermostatic valve 42 is rounded or bevelled at 42a for coaction with a bevelled seat 44 at the inner end of socket 24.

A coiled expansion spring 45 in the upper chamber of head H urges the diaphragm 21 downwardly and tends to unseat the valve 42 to an extent limited by the abutment of nut 26a against the shoulder 18a of head piece 18.

The spring 45 is backed against a screw plug 46, provided with a screw driver slot 48, for the application of a tool to initially adjust the tension on said spring and may be locked against adjustment by tightening a clamp screw 49, passing through the spaced ears 50 of the split annulus within which the plug is threaded.

Laterally of the elongated pendant socket forming portion 24, the casting 18 is provided with an outwardly facing, shallow socket 51 having a passageway 52 in its base communicating with the socket 24. Oil flowing through this passageway from the engine oil pump will fill the space between the valve 42 and its casing, and will fill the cavity below the diaphragm chamber.

A plug 53 screwed into the socket 51 has a central boss or extension 54 internally threaded at 55 for the reception of an oil inlet fitting (not shown). The plug 53 has a peripheral ridge 61 to clamp the periphery of felt filter 60 against a washer 57 in the base of socket 51. Preferably a corrugated wire mesh disk 58 in a corresponding shallow trough 51a serves as a backing for the filter.

In operation, at any season of the year, the apparatus will function as a pressure reducing valve, with spring 45 properly tensioned in accordance with the flow resistance of the distributing system. The pressure of oil entering through inlet 52 will be automatically reduced by the master valve to that required for feeding oil continuously at the rate required into the distributing system from which the oil is emitted at the desired rate determined by the individual drip plugs. More specifically, oil under pressure acting on the under side of the diaphragm 21 balances the spring 45 and causes the tapered end of the valve 42 to seat against the socket end 44. As pressure is relieved by outflow of oil from the diaphragm chamber, the spring will again open the valve and flow of oil past the valve will be resumed until the valve is properly balanced and a continuous stream of oil passes at a reduced pressure into the diaphragm chamber and flows from the outlet 12 to and through the distributing system.

The pressure reducing valve is thus effective to maintain a nearly constant flow rate through the drip plugs under wide variations of pressure at the source.

If the pressure at the source should increase, the spring pressed diaphragm will automatically be deflected upward, correspondingly to restrict valve opening 42—44. If the pressure at the source should decrease, spring 45 will automatically urge the diaphragm downward to enlarge valve opening 42—44. The resistance imposed by the valve 42—44 will at all times vary inversely with the pressure to maintain constancy of feed rate regardless of applied pressure.

Within ordinary summer and winter temperature ranges in the eastern part of the United States, a relatively tremendous variation in the flow resistance of the chassis system which is exposed to the weather may occur. Fifty times more line pressure may be needed in winter than in summer to maintain substantial constancy of oil feed to the chassis bearings.

This variation is automatically compensated for by the action of the thermostatic tube 42 which is of hard rubber or equivalent material having a relatively high coefficient of expansion. Since the valve 42 is anchored to cup 39 contraction of the valve 42 at low temperatures will increase the normal distance between the valve and its seat 44. To seat valve 42 a much greater deflection of the diaphragm and correspondingly greater deflection of spring 45 would be required than before. As pressure is now relieved by outflow of oil from the diaphragm chamber, the spring 45 will maintain valve 42—44 in a position of balance under the higher propulsive pressure required to maintain constancy of feed to the chassis system. At each temperature of use the thermostatic tube 42 thus determines the applied pressure for the required feed of oil.

By the selection of thermostatic material of suitable characteristics, temperature-induced changes in oil viscosity may be compensated for to any desired degree. Complete compensation, partial compensation or over-compensation according to any desired law is possible.

In practice, it is customary to assemble the device at a predetermined temperature with the valve abutting its seat and with the stop nut 26a, which backs the nut 26, a predetermined distance off its seat.

Although the particular structure of the diaphragm chamber is subject to many modifications in accordance with the requirements of an individual system or with individual locations of use, the casting 18 is preferably formed at the side opposite the socket 51 with a pendant bracket portion 71 connected to the head 18 by a strengthening web 72. Bracket 71 at its lower corners has apertured ears 73 for the accommodation of attachment screws.

Means is preferably provided to obviate the danger of robbing the engine of oil in case a break should occur in one of the chassis lubricating lines. In the present case, such means takes the form of an emergency valve arranged within the fitting 301 and acting to automatically cut off flow from the diaphragm chamber to the chassis lines in the event that a break occurs.

Figures 5, 6, 7:
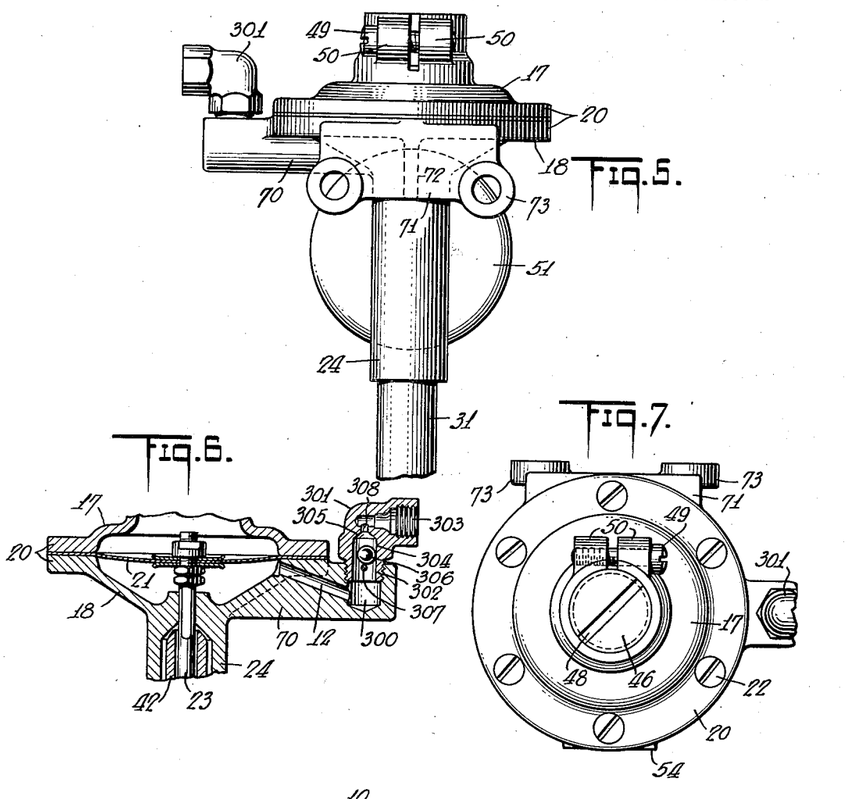
Fig. 5 is a view taken on the scale of Fig. 2 showing an external view of the regulator.
Fig. 6 is a sectional detail on the line 6—6 of Fig. 2.
Fig. 7 is a top plan view of the regulator.

As best seen in Fig. 6, the vertical leg of the elbow fitting 301 is formed with a relatively large passageway 304 therein and having a downwardly facing valve seat 305 at its top. A ball valve 306 is retained in this passageway by cross pin 307, the ball being of insufficient diameter to preclude the flow of oil through the passage 304 and through the reduced passage 308 beyond the valve seat.

This ball is preferably of a specific gravity not much greater than that of the oil, and with the normal slow flow of oil around it, it will sink in the oil and rest on its retaining pin. If however, a break should occur in the chassis line and a sudden increase of the velocity of oil flow should consequently occur, this will cause the oil to pick up the ball and seat it, the ball being thereafter held on its seat during operation of the vehicle by the sustained oil pressure behind it.

By virtue of the provision of this emergency valve operating to close upon substantial increases in the flow rate of oil, even a clean break in one of the chassis lines would not be operative to rob the engine of oil.

While the master regulator is shown mounted in the forward lower corner of the engine compartment with the stem dependent below the frame, it will be obvious that the regulator may be mounted at any suitable location where the thermostatic element thereof is exposed to atmospheric temperature and is not unduly influenced by the heat of the engine.

In Figs. 9 to 12 inclusive, is illustrated another form of the invention of different construction, but operating upon the principles of automatic regulation above described.

The diaphragm chamber is here formed by a pair of cup-shaped members 100 and 101, provided respectively with outwardly extending flanges 102 and 103 between which the edge of the diaphragm 104 is clamped. To secure the two cup-shaped members together, flange 102 is preferably provided with a plurality of bendable fingers 105 wrapped around the flange 103 and pressed into firm engagement therewith. In this case the oil inlet is through a valve controlled fitting 106 in the top of the cup 100 and the oil flows to the distributing line through outlet fittings 107 which, like the fitting 106 have reduced portions 108 passed into the cup and flared at 109 into engagement therewith.

Here again, the oil entering the diaphragm chamber is filtered, the filter pad 110 and its corrugated backing plate 111 of wire mesh being clamped against the base of a socket 112 by a clamping plug 113. Socket 112, in this instance has a stem portion 114 screwed over the inlet 106 and the plug 113 is provided with threaded socket 115 for the reception of an oil inlet pipe. The valve stem 116 extends through a reduced bore 117 of the inlet fitting 106 and carries at its upper end an inlet valve 118, coacting with bevelled upwardly facing seat 119'. Valve stem 116 is connected through thermostatic means, about to be described, (and which vary the effective length of the stem 116) to the diaphragm 104, which is urged upwardly by coiled expansion spring 119 to normally unseat the valve 118.

The means for connecting the valve stem 116 to the diaphragm 104 may comprise a pair of spaced generally parallel bi-metallic thermostatic elements 120, which at each end are connected together in spaced relationship by straps 122 and 123 riveted at 124 to the thermostat bars and having overlapping ears 125 pivotally connected together by a cross pin 126. This pin serves to provide, in effect, a hinged connection between the ends of the bars to allow of their bowing under changing temperatures. The upper bar is connected to the headed lower end 121 of the valve stem 116 by a strap piece 128, fixed to the bar and having portions extending upwardly and overlying the head 121. The lower thermostat bar is connected to the diaphragm by a rod or pin 129, the reduced upper end 130 of which provides an upwardly facing shoulder at 131. The end of pin 129 passes not only through the diaphragm 104 but through the bases 132' of the reinforcing cups or washers 132, at opposite sides thereof, through a spacing washer 133, and through the lower thermostatic bar 120 over which it is spun at 134 to clamp these members against the shoulder 131. The upper reinforcing washer or cup 132 has diametrically opposed cutaway portions 135 therein to accommodate the thermostat bars 120.

The construction above described incorporates the thermostat elements as part of the connection between the diaphragm and the valve 116, so that the valve setting will depend upon the temperature of the oil.

The spring 119 reacts against a screw plug 136 with a slot 138 and threaded into a cylindrical extension 137 of the cup 101. The plug has an axial opening 139 in which the end of pin 129 is guided. This latter opening is intersected by a diametrically extending slot 140, opening through one side of the plug. This slot is enlarged at its inner closed end as indicated at 141. A set screw 142, screwed into the slot 140 adjacent its open end spreads the screw plug and jams it into locked engagement with the internally threaded wall of the cup extension 137.

The spring 119 is made with comparative accuracy so that not more than one complete revolution of the plug 136 is required for proper tension in the initial adjustment. To limit the rotation of the plug, a screw cap 146, locked by inward protuberances 147, affords an inturned stop 144 for a pin 143 projecting from the face of the plug.

The perforated L-shaped attachment bracket 150 here shown is merely one of various possible means of support for attachment of the automatic regulator of Figs. 9 to 12. The operation of this form of the device is quite similar to the form shown in Figs. 1 to 8. Briefly, the valve 118 is normally unseated by the spring 119 which acts through the diaphragm 104 and is moved to a balanced position adjacent its seat as the spring is compressed by the pressure of oil on the diaphragm 104. Here again the balancing, pressure-reducing spring renders the regulator self-compensating for variations in pressure at the pressure source and the thermostat renders it self-compensating for variations in the temperature of the air and therefore of the oil in the distributing system.

Emergency valves similar to the valve 302 of Fig. 6, may be employed just beyond both outlets 107 if desired.

With the form of the invention shown in Figs. 1 to 8, the head of the regulator may be mounted within the engine compartment, since substantially the entire length of the thermostatic element is exposed externally of the engine hood. The entire unit of Figs. 9 to 12 is preferably mounted outside of the engine compartment, say, for instance, on one of the chassis frame bars near the forward end of the car. With either form of regulator, it is preferable to have the thermostats in such relation with respect to the engine as to be substantially unaffected thereby.

The pressure-reducing valve unit of the present application and the thermostatic controlling device shown in the embodiments of Figs. 1 to 7 and Figs. 9 to 12 may be broadly applied in connections other than in chassis lubrication to the control of liquid or lubricant flow to various places of use and disposal.

I claim:—

1. A branched fluid distributing system having flow controlling outlets of invariant flow resistance, a pressure source feeding fluid into said system at a pressure in excess of the pressure required to force fluid through the outlet devices at the desired rate and a pressure reducing valve obstructing and restricting the flow interposed between said pressure source and the branches of said system, said flow controlling outlets having a resistance so much higher than that of the distributing system as to have a predominating influence upon the distribution of lubricant among the outlets and said valve having an obstructing effect so materially higher than that of said outlets as to have a predominating control of the amount of fluid fed into the system.

2. A branched fluid distributing system having flow controlling outlets of invariant flow resistance, a pressure source feeding fluid into said system at a pressure in excess of the pressure required to force fluid through the outlet devices at the desired rate and a pressure reducing valve obstructing and restricting the flow interposed between said pressure source and the branches of said system, said valve being operative automatically to compensate for variations in pressure at the source.

3. A centralized lubricating system including a source of lubricant under pressure, a branched distributing system having flow restricting outlets and a master regulator interposed in the path of flow from the pressure source to the distributing system, said regulator comprising a pressure reducing valve obstructing and restricting the flow operative to insure a substantially constant rate of flow ino the distributing system regardless of the pressure at the source.

4. A branched oil distributing system having flow controlling outlets of invariant flow resistance, a pressure source feeding oil into said system at a pressure in excess of the pressure required to force oil through the outlet devices at the desired rate and a pressure reducing valve obstructing and restricting the flow interposed between said pressure source and the branches of said system, said valve being operative automatically to compensate for variations in pressure at the source, and thermostatic means acting on the reducing valve to compensate for increased flow resistance in the distributing system due to increase in oil viscosity with fall in temperature.

5. In a centralized lubricating system of the type including distributing conduits having outlets of invariant relative flow resistance, a source of lubricant, and pressure means tending to oversupply said distributing conduits with lubricant at pressures greater than that required for proper emission from the outlets, and a master regulator valve device obstructing and restricting the flow acting to reduce said pressure to the extent required for insuring the desired flow rate from the outlets, said valve device having an obstructing and restricting effect so predominating as compared to the restriction of said outlets as to control the desired flow rate from said outlets, said outlets in turn controlling the distribution of lubricant as between the outlets but not the total amounts of lubricant supplied to said outlets.

6. In a centralized lubricating system of the type including distributing conduits having outlets of invariant relative flow resistance, a source of lubricant, and pressure means tending to oversupply said distributing conduits with lubricant at pressures greater than that required for proper emission from the outlets, a master regulator device obstructing and restricting the flow acting to reduce said pressure to the extent required for insuring the desired flow rate from the outlets, said device including a valve means and a thermostatic means controlling said valve means, said device serving to compensate automatically for variations in the flow resistance of the distributing system induced by temperature variations.

7. In a centralized lubricating system of the type including distributing conduits having outlets of invariant relative flow resistance, a source of lubricant, and pressure means tending to oversupply said distributing conduits with lubricant at pressures greater than that required for proper emission from the outlets, and a master regulator device obstructing and restricting the flow acting to reduce said pressure to the extent required for insuring the desired flow rate from the outlets, said regulator comprising a reducing valve acting automatically to maintain any desired flow rate through the distributing system.

8. In a centralized lubricating system of the type including distributing conduits having outlets of invariant relative flow resistance, a source of lubricant, and pressure means tending to oversupply said distributing conduits with lubricant at pressures greater than that required for proper emission from the outlets, and a master regulator device acting to reduce said pressure to the extent required for insuring the desired flow rate from the outlets, said means including a yielding adjustable pressure absorbing element interposed between the source and the outlets of the distributing system.

9. In a centralized lubricating system of the type including distributing conduits having outlets of invariant relative flow resistance, a source of lubricant, and pressure means tending to oversupply said distributing conduits with lubricant at pressures greater than that required for proper emission from the outlets, and a master regulator device obstructing and restricting the flow acting to reduce said pressure to the extent required for insuring the desired flow rate from the outlets, said device including a spring controlled valve and a thermostatic means actuating said valve, said device automatically compensating for changes in flow retarding effect due to changes in temperature of the lubricant.

10. A fluid distributing system comprising a central reservoir, a central pump receiving lubricant from said reservoir, a distribution system with branched piping conduits having a plurality of restricted outlets and a single inlet, said inlet being provided with a thermostatically operated pressure reducing valve including a casing and a diaphragm therein, said casing having an inlet and outlet therein at one side of the diaphragm, a valve associated with the inlet, a valve seat cooperating with said valve, a spring acting on the diaphragm to normally open the valve and thermostatic means regulating the normal distance between the valve and its seat when the valve is fully unseated by the diaphragm.

11. A fluid distribution system comprising a central reservoir, a central pump receiving lubricant from said reservoir, a distribution system with branched piping conduits having a plurality of restricted outlets and a single inlet, said inlet being provided with a thermostatically operated pressure reducing valve including a casing and a diaphragm therein, said casing having an inlet and outlet therein at one side of the diaphragm, a valve connected to said diaphragm and associated with the inlet, a valve seat cooperating with said valve, a spring acting on the diaphragm to normally open the valve and thermostatic means regulating the normal distance between the valve and its seat when the valve is fully unseated by the diaphragm, the thermostat comprising an elongated piece of thermostatic material.

12. A fluid distribution system comprising a central reservoir, a central pump receiving lubricant from said reservoir, a distribution system with branched piping conduits having a plurality of restricted outlets and a single inlet, said inlet being provided with a thermostatically operated pressure reducing valve including a casing and a diaphragm therein, said casing having an inlet and outlet therein at one side of the diaphragm, a valve connected to said diaphragm and associated with the inlet, a valve seat cooperating with said valve, a spring acting on the diaphragm to normally open the valve and thermostatic means regulating the normal distance between the valve and its seat when the valve is fully unseated by the diaphragm, the thermostat comprising an elongated piece of thermostatic material, one end of which constitutes the valve.

13. A fluid distribution system comprising a central reservoir, a central pump receiving lubricant from said reservoir, a distribution system with branched piping conduits having a plurality of restricted outlets and a single inlet, said inlet being provided with a thermostatically operated pressure reducing valve including a casing and a diaphragm therein, said casing having an inlet and outlet therein at one side of the diaphragm, a valve having a stem connected to said diaphragm and associated with the inlet, a valve seat cooperating with said valve, a spring acting on the diaphragm to normally open the valve and thermostatic means regulating the normal distance between the valve and its seat when the valve is fully unseated by the diaphragm, the thermostat comprising an elongated piece of thermostatic material one end of which constitutes the valve, said material being connected to the valve stem but free for expansion or contraction.

14. In a centralized lubricating system of the character in which branched distributing conduits are provided with outlets of invariant high flow resistance, a pressure source normally developing a pressure in excess of that required for proper emission from the system, a thermostatic master regulator device obstructing and restricting the flow arranged between the pressure source and the distributing system and reducing the pressure of the lubricant passing into said system to an extent approximately inversely proportional to the viscosity of the lubricant in the system.

15. In a centralized lubricating system of the character which includes distributing conduits having flow proportioning outlets of invariant high flow resistance, a lubricant source, means for forcing the lubricant under pressure from said source into said system and a master regulating device interposed in the line of flow from the source to the system, said regulating device comprising a pressure reducing valve thermostatically controlled to compensate for temperature induced changes in the viscosity of the lubricant.

16. A fluid distribution system comprising a central reservoir, a central pump receiving lubricant from said reservoir, a distribution system with branched piping conduits having a plurality of restricted outlets and a single inlet, said inlet being provided with a master regulator unit of the class described including a diaphragm casing having an inlet and outlet, a diaphragm in the casing, a valve stem connected to the diaphragm and extending through said inlet, a valve carried by the valve stem and controlling the flow of lubricant into the diaphragm casing, a spring acting on the diaphragm to normally unseat the valve, a casing for the valve and stem, and means carried by a portion of said casing for filtering the oil entering the latter.

17. A fluid distribution system comprising a central reservoir, a central pump receiving lubricant from said reservoir, a distribution system with branched piping conduits having a plurality of restricted outlets and a single inlet, said inlet being provided with a master regulator unit of the class described including a diaphragm casing having an inlet and outlet, a diaphragm in the casing, a valve stem connected to the diaphragm and extending through said inlet, a valve carried by the valve stem and controlling the flow of lubricant into the diaphragm casing, a spring acting on the diaphragm to normally unseat the valve, a casing for the valve and stem, and means carried by a portion of said casing for filtering the oil entering the latter, the valve comprising a bar of thermostatic material, one end of which coacts with a seat in the valve stem casing.

18. A fluid distribution system comprising a central reservoir, a central pump receiving lubricant from said reservoir, a distribution system with branched piping conduits having a plurality of restricted outlets and a single inlet, said inlet being provided with a valve mechanism including a valve body having a valve seat, a valve stem working through the body, a valve fixed to the stem and spring means normally tending to unseat said valve, said valve being of a material having a high co-efficient of expansion and free to expand or contract and thereby vary its normal distance from the seat.

19. A fluid distribution system comprising a central reservoir, a central pump receiving lubricant from said reservoir, a distribution system with branched piping conduits having a plurality of restricted outlets and a single inlet, said inlet being provided with a thermostatic valve comprising an elongated hard rubber tube, a seat with which one end of said tube is adapted to coact, a valve stem mounting the valve, means acting on the stem to normally maintain the valve in predetermined position relatively to its seat, said valve being movable relatively to its stem under changing temperature conditions.

20. In an automotive vehicle including a chassis, an engine and an engine oil pump deriving lubricant from the crank case of the engine, a chassis lubricant system including a plurality of distributing conduits having outlets to the bearings to be lubricated, said engine oil pump being arranged to discharge part of its charge into the distributing conduits and a thermostatically controlled flow reducing valve interposed between the pump and the conduits.

21. In an automotive vehicle including a chassis, an engine and an engine oil pump deriving lubricant from the crank case of the engine, a chassis lubricant system including a plurality of distributing conduits having outlets to the bearings to be lubricated, said engine oil pump being arranged to discharge part of its charge into the distributing conduits and a thermostatic flow reducing valve interposed between the pump and the conduits, said valve being mounted forwardly of the engine with its thermostat arranged substantially exteriorly of the engine compartment.

22. In an automotive vehicle including a chassis, and an engine compartment thereon, a chassis lubricating system including a source of oil mounted on the chassis, a system of conduits having outlets at the bearings to be oiled, means deriving oil from said source and forcing it under pressure into said conduits, and a master regulator at the inlet to said conduits thermostatically controlling the pressure of the oil fed thereto in accordance with the temperature of the outer air.

23. In an automotive vehicle including a chassis, and an engine compartment thereon, a chassis lubricating system including a source of oil mounted on the chassis, a system of conduits having outlets at the bearings to be oiled, means deriving oil from said source and forcing it under pressure into said conduits, and a master regulator at the inlet to said conduits thermostatically controlling the pressure of the oil fed thereto in accordance with the temperature of the outer air, said regulator being disposed adjacent the front of the engine compartment with its thermostatic element substantially unaffected by temperatures prevailing in said compartment.

24. A centralized lubricating system including a source of lubricant under pressure, a branched distributing system having flow restricting outlets and a master regulator comprising a spring operated reducing valve interposed in the path of flow from the pressure source to the distributing system, thermostatic means coacting with said valve to compensate for increased flow resistance in the distributing system due to increase in oil viscosity with fall of temperature, the spring being arranged to urge the valve in the direction of its seat the pressure at the same tending to seat the valve, and the thermostat being arranged to draw the valve away from its seat as the temperature lowers.

25. A centralized lubricating system including a source of lubricant under pressure, a branched distributing system having flow restriction outlets, a master regulator including a thermostatically influenced pressure reducing valve interposed in the path of flow from the pressure source to the distributing system, the reducing valve including spring means normally tending to unseat the valve and thermostatic means increasingly tending to unseat the valve as the temperature lowers.

26. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring and a source of oil under pressure, said oil normally flowing past the valve into the diaphragm casing and acting on the diaphragm to tend to seat the valve.

27. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing and acting on the diaphragm to tend to seat the valve, and thermostatic means determining the pressure required to seat the valve.

28. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing and acting on the diaphragm to tend to seat the valve, thermostatic means determining the pressure required to seat the valve, and said means including a thermostat unit forming part of the valve stem and operated to vary the length of the latter.

29. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing and acting on the diaphragm to tend to seat the valve, thermostatic means determining the pressure required to seat the valve, said means comprising a thermostat element immersed in the oil at the region of the master regulator.

30. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing and acting on the diaphragm to tend to seat the valve, and thermostatic means determining the pressure required to seat the valve, said means comprising a thermostat element arranged in the casing and immersed in the oil therein.

31. A centralized lubricating system comprising a fluid distribution system comprising a central reservoir, a central pump receiving lubricant from said reservoir, a distribution system with branched piping conduits having a plurality of restricted outlets and a single inlet, said inlet being provided with a master regulator unit including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing during operation of the system and acting on the diaphragm to tend to seat the valve, and means arranged exteriorly of the casing adjustable to regulate the tension of the spring.

32. A fluid distribution system comprising a central reservoir, a central pump receiving lubricant from said reservoir, a distribution system with branched piping conduits having a plurality of restricted outlets and a single inlet, said inlet being provided with a master regulator unit of the class described including a casing comprising an upper chamber and a dependent tubular member communicating therewith, a filter through which oil flows into the tubular member, a valve controlling the flow of liquid from the tubular member into the chamber, a diaphragm in the chamber connected to the valve and a spring acting on the diaphragm to unseat the valve.

33. A fluid distribution system comprising a central reservoir, a central pump receiving lubricant from said reservoir, a distribution system with branched piping conduits having a plurality of restricted outlets and a single inlet, said inlet being provided with a master regulator unit of the class described including a casing comprising an upper chamber and a dependent tubular member communicating therewith, a filter through which oil flows into the tubular member, a valve controlling the flow of liquid from the tubular member into the chamber, a diaphragm in the chamber connected to the valve and a spring acting on the diaphragm to unseat the valve, and thermostatic means in the tubular member supplementing the action of the spring and compensating for temperature induced changes in viscosity of the oil.

34. A fluid distribution system comprising a central reservoir, a central pump receiving lubricant from said reservoir, a distribution system with branched piping conduits having a plurality of restricted outlets and a single inlet, said inlet being provided with a master regulator unit for centralized lubricating systems including a casing and a diaphragm therein, a valve stem connected to the diaphragm, a valve on the stem coacting with a seat fixed relatively to the casing, a spring acting on one side of the diaphragm and acting to unseat the valve, oil inlets and outlets in the diaphragm casing at the side opposite the spring, a source of oil under pressure, said oil normally flowing past the valve into the diaphragm casing during operation of the system and acting on the diaphragm to tend to seat the valve, and means arranged exteriorly of the casing adjustable to regulate the tension of the spring, and means limiting the extent of said adjustment.

35. A chassis lubricating system including a central source of oil maintained at a substantially constant temperature, a branched distributing system having flow restricting outlets at the bearings to be oiled, said outlets being subject to the varying temperatures of the air, means for forcing oil from said source under pressure into the distributing conduits and master regulator means obstructing and restricting the flow also subject to temperature changes interposed between the pressure source and the outlets and tending to maintain a uniform rate of emission from the outlets under varying temperature conditions.

36. A centralized lubricating system including a source of lubricant under pressure, a branched distributing system having flow restricting outlets and a master regulator interposed in the path of flow from the pressure source to the distributing system, said regulator comprising a pressure reducing valve operative to insure a substantially constant rate of flow into the distributing system regardless of the pressure at the source, said source also circulating lubricant to another place of use other than said system, and means to block flow from the regulator into the system when a dangerous leak occurs in the distributing system, whereby said place of use will not be deprived of its lubricant supply.

37. A centralized lubricating system including a source of lubricant under pressure, a branched distributing system having flow restricting outlets and a master regulator interposed in the path of flow from the pressure source to the distributing system, said regulator comprising a pressure reducing valve operative to insure a substantially constant rate of flow into the distributing system regardless of the pressure at the source, said source also circulating lubricant to another place of use other than said system, and means responsive to the velocity of oil flow to cut off such flow when a break or substantial leak occurs between the regulator and the outlets, whereby said place of use will not be deprived of its lubricant supply.

38. A centralized lubricating system including a source of lubricant under pressure, a branched distributing system having flow restricting outlets and a master regulator interposed in the path of flow from the pressure source to the distributing system, said regulator comprising a pressure reducing valve operative to insure a substantially constant rate of flow into the distributing system regardless of the pressure at the source, said source also circulating lubricant to another place of use other than said system, and an emergency valve at the regulator outlet to cut off flow of oil from the outlet when a leak occurs in the distributing system beyond the regulator, whereby said place of use will not be deprived of its lubricant supply.

39. An engine and chassis lubricating system including a source of oil supply and a pump, outlet conduits leading in parallel from the pump to the engine and the chassis system respectively, the chassis system including a plurality of distributing conduits having flow restricting outlets at the bearings to be oiled and including a master regulator device through which oil from the pump must pass to reach the distributing conduits, said pump normally developing a pressure in excess of that required for passing lubricant at the desired rate to the chassis bearings, said master regulator being operative to automatically reduce varying pump pressure to the pressure required for proper feed to the chassis bearings.

40. An engine and chassis lubricating system including a source of oil supply and a pump, outlet conduits leading in parallel from the pump to the engine and the chassis system respectively, the chassis system including a plurality of distributing conduits having flow restricting outlets at the bearings to be oiled and including a master regulator device through which oil from the pump must pass to reach the distributing conduits, said pump normally developing a pressure in excess of that required for passing lubricant at the desired rate to the chassis bearings, said master regulator being operative to automatically reduce varying pump pressure to the pressure required for proper feed to the chassis bearings, and a by-pass pipe from the pump to the lubricant source operable to limit the maximum pressures under which oil is delivered by the pump.

41. An engine and chassis lubricating system including a source of oil supply and a pump, outlet conduits leading in parallel from the pump to the engine and the chassis system respectively, the chassis system including a plurality of distributing conduits having flow restricting outlets at the bearings to be oiled and including a master regulator device through which oil from the pump must pass to reach the distributing conduits, said pump normally developing a pressure in excess of that required for passing lubricant at the desired rate to the chassis bearings, said master regulator being operative to automatically reduce varying pump pressure to the pressure required for proper feed to the chassis bearings, a by-pass pipe from the pump to the lubricant source operable to limit the maximum pressures under which oil is delivered by the pump, and means disposed at a restricted part of the chassis lubricating system in advance of the distributing conduits sensitive to the velocity of oil flow and operating when a leak occurs in the chassis system to cut off feed of oil thereto.

42. An engine and chassis lubricating system including a source of oil supply and a pump, outlet conduits leading in parallel from the pump to the engine and the chassis system respectively, the chassis system including a plurality of distributing conduits having flow restricting outlets at the bearings to be oiled and including a master regulator device through which oil from the pump must pass to reach the distributing conduits, a relief valve limiting the pressure developed at the pump and the master regulator including a pressure reducing valve regulating the pressure applied at the outlets.

43. An engine and chassis lubricating system including a source of oil supply and a pump, outlet conduits leading in parallel from the pump to the engine and the chassis system respectively, the chassis system including a plurality of distributing conduits having flow restricting outlets at the bearings to be oiled and including a master regulator device through which oil from the pump must pass to reach the distributing conduits, a relief valve limiting the pressure developed at the pump, the master regulator including a pressure reducing valve regulating the pressure applied at the outlets, and thermostatically compensating for increased flow resistance in the system due to fall in temperature.

44. A fluid distribution system comprising a central reservoir, a central pump receiving lubricant from said reservoir, a distribution system with branched piping conduits having a plurality of restricted outlets and a single inlet, said inlet being provided with a master regulator device of the class described including an upper chamber and a dependent tubular member, a diaphragm in the chamber, a valve stem connected to the diaphragm and extending into the hollow tubular member, an inlet in the hollow tubular member, a flow passage from the tubular member into the chamber, an outlet from the chamber, a valve carried by the stem and adapted to coact with a seat in advance of said flow passage, and a spring acting on the diaphragm and normally tending to unseat the valve.

45. A fluid distribution system comprising a central reservoir, a central pump receiving lubricant from said reservoir, a distribution system with branched piping conduits having a plurality of restricted outlets and a single inlet, said inlet being provided with a master regulator device of the class described including an upper chamber and a dependent tubular member, a diaphragm in the chamber, a valve stem connected to the diaphragm and extending into the hollow tubular member, an inlet in the hollow tubular member, a flow passage from the tubular member into the chamber, an outlet from the chamber, a valve carried by the stem and adapted to coact with a seat in advance of said flow passage, and a spring acting on the diaphragm and normally tending to unseat the valve, said valve comprising a hollow bar of thermostatic material attached at its lower end only to the valve stem, the other end of the bar coacting with the seat.

46. A fluid distributing installation comprising a branched conduit system having flow controlling outlets of substantially invariant flow resistance, a pressure source feeding fluid into the inlet of said system and a temperature-responsive variable flow resistance obstructing and restricting the flow associated with said inlet in the course of flow from the pressure source to the inlet of said system, said temperature-responsive resistance affording decreased obstruction and restriction with lowered temperatures and increased resistance and obstruction with elevated temperatures.

47. A fluid distributing installation comprising a branched conduit system having flow controlling outlets of substantially invariant flow resistance, a pressure source feeding fluid into the inlet of said system and a pressure-responsive variable flow resistance obstructing and restricting the flow associated with said inlet in the course of flow from the pressure source to the inlet of said system.

48. A centralized lubricating installation of type subject to wide variations of temperature in use, including a source of pressure, a distributing system connected thereto, regulating means interposed between the source and the distributing system to maintain substantial constancy of feed at various temperatures, said means comprising a flow rate control element in series with the distributing system, differential pressure responsive means regulating said element actuated by the back pressure in said system, and temperature responsive means regulating said element upon changes in temperature of the lubricant passing therethrough.

49. In a liquid distribution system, a series of distributing conduits, a source of pressure common to said conduits, a liquid supply common to said conduits and a thermostatic spring seated valved lubricant flow controlling device also common to said conduits positioned between the source of pressure and the conduits in the path of lubricant flow.

50. A lubricant distribution system comprising a lubricant supply, a source of pressure including a lubricant pump receiving lubricant from said supply, branch conduits receiving lubricant from said source of pressure and extending to points of distribution, flow controlling outlets at the points of distribution and temperature responsive valve means to control the lubricant pressure supplied to said distribution system from said pump.

51. In a centralized lubricating system, the combination of a source of lubricant under pressure, a plurality of bearings to be lubricated, a main conduit having branch conduits connecting said source with said bearings, means between the source and main conduit for adjustably controlling the pressure of the lubricant in the main and branch conduits, and temperature controlled means for determining the adjustment of said last named means in accordance with changes in viscosity of the lubricant due to temperature changes.

52. A branched fluid distributing system having flow controlling outlet devices subject during operation to wide variations in flow resistance, a pressure source feeding fluid into said system, and regulator means interposed between said pressure source and the branches of said system to minimize variations in flow rate under varying resistance conditions, said regulator means including a flow resisting valve through which lubricant flows to the system and means responsive to temperature variations to determine the setting of said valve for flow resistance thereof in inverse ratio to that of said distributing system.

53. A branched fluid distributing system having flow controlling outlet devices subject during operation to wide variations in flow resistance, a pressure source feeding fluid into said system, and regulator means interposed between said pressure source and the branches of said system to minimize variations in flow rate under varying resistance conditions, said regulator means including a flow resisting valve through which lubricant flows to the system and means responsive to temperature and pressure variations to determine the setting of said valve for flow resistance thereof in inverse ratio to that of said distributing system.

54. In a centralized lubricating system, the combination of a source of lubricant under pressure, a plurality of bearings to be lubricated, a main conduit having branch conduits connecting said source with said bearings, means between the source and main conduit for adustably controlling the pressure of the lubricant in the main and branch conduits, and temperature controlled means for determining the adjustment of said last named means in accordance with changes in viscosity of the lubricant due to temperature changes, said temperature control means comprising a pressure responsive device, a connection to subject said pressure responsive device to the lubricant pressure in said system, a spring to bias said pressure responsive device against said lubricant pressure in said system, a valve actuated by said pressure responsive device, and thermostatic means controlling the position of said valve in respect to said pressure responsive device.

55. In a centralized lubricating system, the combination of a source of lubricant under pressure, a plurality of bearings to be lubricated, a main conduit having branch conduits connecting said source with said bearings, means between the source and main conduit for adjustably controlling the pressure of the lubricant in the main and branch conduits, and pressure control means for determining the adjustment of said last named means in accordance with changes in pressure at said source.

56. In a centralized lubricating system, the combination of a source of lubricant under pressure, a plurality of bearings to be lubricated, a main conduit having branch conduits connecting said source with said bearings, means between the source and main conduit for adjustably controlling the pressure of the lubricant in the main and branch conduits, and pressure control means for determining the adjustment of said last named means in accordance with changes in pressure at said source, said pressure control means including a pressure responsive device, a connection to said pressure responsive device to apply to one side of said pressure responsive device the lubricant pressure in said system, resilient means biasing said pressure responsive device against the lubricant pressure in said system and a valve actuated by said pressure responsive device.

JOSEPH BIJUR.